Oct. 6, 1931.                E. J. DELAHANTY                1,826,126
                              MOTOR SUPPORT
                            Filed July 19, 1926
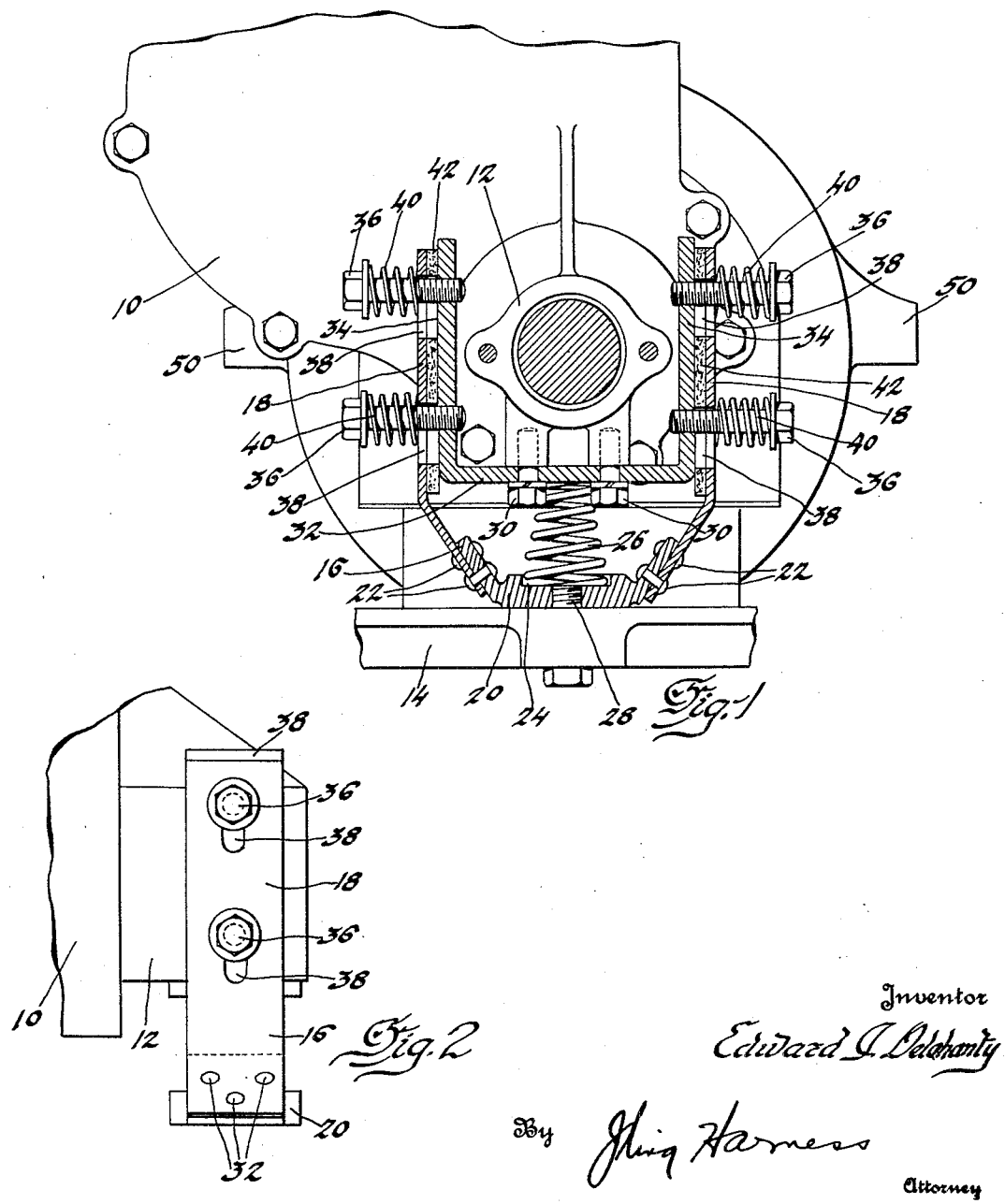
Inventor
Edward J. Delahanty
By Irving Harness
Attorney Patented Oct. 6, 1931

1,826,126

UNITED STATES PATENT OFFICE

EDWARD J. DELAHANTY, OF LAKE ST. CLAIR, MICHIGAN, ASSIGNOR TO CHRYSLER CORPORATION, OF DETROIT, MICHIGAN, A CORPORATION OF DELAWARE

MOTOR SUPPORT

Application filed July 19, 1926. Serial No. 123,361.

This invention relates to a resilient mounting and has for its primary object the provision of a mounting in which vibration from one of two parts is dampened out, thereby preventing the vibration from being transmitted to the other of said parts.

In the mounting of an engine to the frame of an automobile it is important to reduce the amount of vibration caused by the engine and to prevent its being transmitted to the frame. It is also desirable to provide a flexible mounting of such construction that will allow the frame to twist without injury to the engine or to the mounting.

An object of the present invention is to provide a device in which the engine is resiliently supported and one in which friction is interposed between the parts to eliminate vibration between said parts.

These and other objects of the invention will more fully appear from the following specification and claims taken in connection with the accompanying drawings, in which:

Fig. 1 is a sectional view showing the invention applied as a front end motor support.

Fig. 2 is a side elevation of the mounting shown in Fig. 1.

As an illustration of the application of my improved support, it has been shown as a mounting for the front end of an automobile engine 10 having a forwardly projecting boss 12. Ordinarily the boss 12 is rigidly secured to the frame cross member 14 and by such a mounting any vibration in the engine is conducted through the frame to the body, where it is very objectionable.

To overcome this objection I have provided a mounting comprising a resilient support interposed between the frame cross member and the engine. A saddle 16 secured to the frame cross member 14 is provided with a pair of upwardly extending members 18 and a base portion 20. This saddle, if desired, may be made of one integral piece, but to obtain more resiliency it has been shown with flat upwardly extending members 18 attached to the base portion 20 by means of rivets 22.

A depression 24 is formed in the base 20 for a coil spring 26 and the bolt 28 secures the base to the cross member 14.

Secured to the boss 12 by means of bolts 30 is a channel shaped bracket 32, the upper flanges or faces 34 of which are adjacent to and parallel with the faces of the upwardly extending members 18. The bracket 32 has been shown separate from the boss 12 but if desired a pair of faces may be formed on the boss 12 and the bracket dispensed with. For convenience of manufacture and to obtain more resiliency, the stamped bracket is preferred.

The bracket 32 attached to the boss 12 or front end of the motor rests on the spring 26 and the vertical movement of the engine is guided by the upright members 18. Bolts 36 carried by the flanges 34 or guiding faces of the bracket 32 extend through slots 38 in the upright members 18 and are provided with springs 40 adapted to force the members 18 against the faces 34. A friction lining 42 interposed between the faces 34 and 18 retards the vertical movement of the engine and dampens out the vibration of the engine before it reaches the frame. The pressure of the springs 40 may be varied if desired by the adjustment of the bolts 36 to change the pressure applied to the lining 42 against the face 34 to produce the proper amount of friction required in breaking up the engine vibration.

A motor supported in accordance with my invention will be resiliently held both in a horizontal and vertical plane so that the vibration transmitted through both planes is eliminated and the front end of the motor is free to move in a vertical plane between its horizontal support. The rear motor supports 50 should be positioned at a point on the motor where the vibration due to unbalanced inertia forces in the motor will not be manifested—or as nearly to that point as is possible.

What I claim is:

1. In a support of the class described comprising a saddle secured to the frame of an automobile, a pair of upwardly extending arms having friction faces on their inner sides, a motor, a bracket carried by said motor having a pair of upwardly extending arms adjacent and between said first mentioned arms, resilient means urging one pair of arms against the other pair of arms, and resilient means at the lower end of said motor between the motor and said saddle.

2. In a support of the class described comprising a saddle secured to the frame of an automobile, a pair of upwardly extending arms having friction faces on their inner sides, a motor, a pair of faces carried by the motor adapted to engage said friction faces, resilient means urging said friction faces against the faces carried by said motor, and resilient means at the lower end of said motor between the motor and said saddle.

3. In a support of the class described comprising a pair of upwardly extending resilient arms secured to the frame of an automobile, a motor, resilient means between said arms adapted to support said motor, a pair of lateral faces carried by said motor for frictional engagement with said arms, and resilient means carried by said faces urging said arms against said faces.

4. In a motor support of the class described resilient means for supporting the motor in a vertical plane, lateral supports in frictional engagement with said motor positively securing the latter against movement about its longitudinal axis, and means for adjusting the pressure of said lateral supports against said motor.

5. In a support of the class described comprising a base portion adapted to be secured to one of two independent parts, a pair of upwardly extending arms on said base portion, resilient means carried by said base portion adapted to support the other of the two independent parts, and friction means interposed between said last named part and said arms.

6. In a motor support of the class described, a base portion adapted to be secured to the frame of an automobile, a pair of resilient arms extending upwardly from said base portion, a channel shaped bracket secured to said motor with its opposite flanges adjacent and parallel to said upwardly extending arms, friction members interposed between said bracket and said base portion, screw threaded members extending through slots in said arms, carried by the flanges of said channel members, and resilient means carried by said screw threaded members for yieldingly urging the arms and said friction members against the flanges of said channel shaped bracket.

7. In a motor support of the class described, resilient means for yieldably holding a motor against downward movement, and lateral supports for frictionally engaging said motor so as to dampen downward movement thereof and positively secure said motor against movement about its longitudinal axis.

EDWARD J. DELAHANTY.